(12) United States Patent
Zagoroff

(10) Patent No.: US 8,444,200 B2
(45) Date of Patent: May 21, 2013

(54) RETROFIT TAILGATE DAMPER

(75) Inventors: Dimiter S. Zagoroff, Lincoln, MA (US);
Polly Drinkwater, legal representative, Lincoln, MA (US)

(73) Assignee: Polly B. Drinkwater, Lincoln, MA (US)

( * ) Notice: Subject to any disclaimer, the term of this patent is extended or adjusted under 35 U.S.C. 154(b) by 34 days.

(21) Appl. No.: 13/038,815

(22) Filed: Mar. 2, 2011

(65) Prior Publication Data

US 2011/0215610 A1   Sep. 8, 2011

Related U.S. Application Data

(60) Provisional application No. 61/309,636, filed on Mar. 2, 2010.

(51) Int. Cl.
*B62D 33/03* (2006.01)
(52) U.S. Cl.
USPC .............................. 296/57.1; 296/50; 49/339

(58) Field of Classification Search
USPC ................. 296/50, 56, 57.1, 59; 49/339, 340, 49/341
See application file for complete search history.

(56) References Cited

U.S. PATENT DOCUMENTS

| 7,695,043 | B2 | 4/2010 | Zagoroff | |
| 2008/0277960 | A1* | 11/2008 | Zagoroff | 296/57.1 |

* cited by examiner

*Primary Examiner* — Glenn Dayoan
*Assistant Examiner* — Jason S Daniels
(74) *Attorney, Agent, or Firm* — Hamilton, Brook, Smith & Reynolds, P.C.

(57) ABSTRACT

A tailgate control mechanism used to exert a force on a pivot. The tailgate may include a pivoting main body and a pivot fixed to a truck bed, where the main body may move about the pivot. The tailgate may also include a piston element including a first end connected to the pivot and a second end connected to the main body. The second end may be positioned above the first end when the main body is in a closed position. The piston element may also be configured to provide a counter force to balance the weight of the tailgate. The piston element may also be retrofitted.

21 Claims, 3 Drawing Sheets

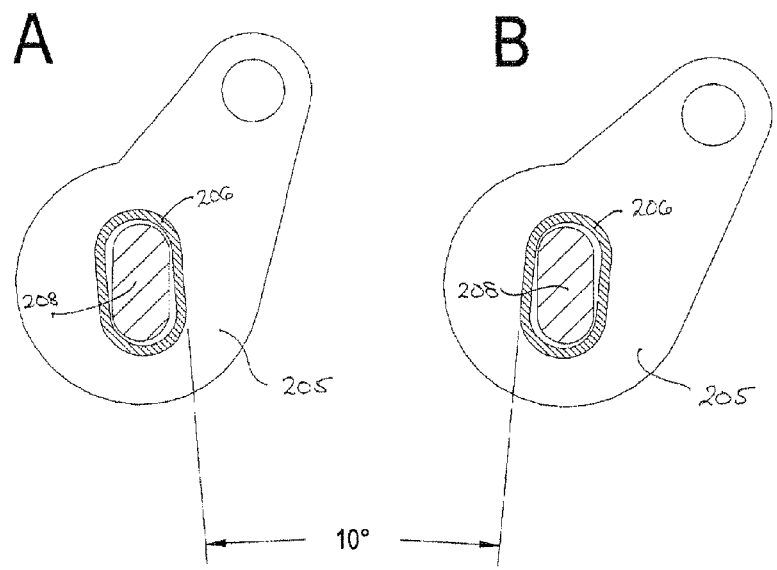
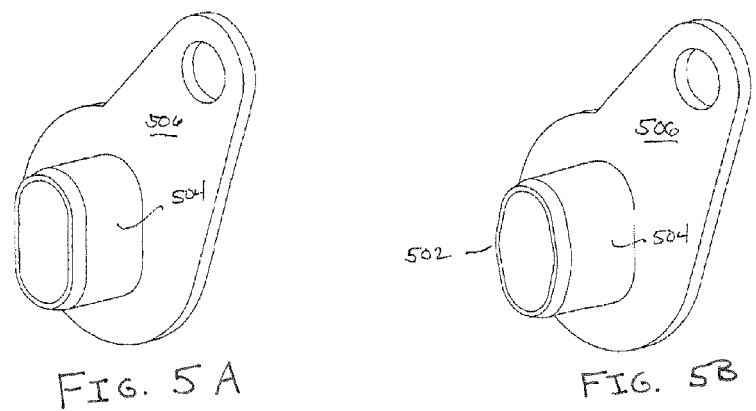
Fig. 4
FIG. 5A  FIG. 5B

RETROFIT TAILGATE DAMPER

RELATED APPLICATION

This application claims the benefit of U.S. Provisional Application No. 61/309,636, filed on Mar. 2, 2010. The entire teachings of the above application are incorporated herein by reference.

BACKGROUND OF THE INVENTION

An unexpected bonus of retrofitting a damper to ease the descent of a tailgate is the fact that the installation of a damper, which improves the down-performance, also makes it possible to improve the up-performance when using a torque rod to counterbalance the weight of the tailgate. Design Engineers generally have opted to provide only modest assist for fear that a fully-balanced tailgate, or a tailgate with a stronger lift assist, will kick up and down violently when driving with an open tailgate.

SUMMARY OF THE INVENTION

There is a market need for a damping mechanism for a tailgate that has lift assist counterbalance. The damper has a piston element that is firmly connected at one end to a ferrule for a tailgate counterbalance at an offset location above the axis of rotation of the tailgate. The ferrule remains in a fixed orientation relative to the vehicle's bed. The second end of the piston element is connected at a fixed location on the tailgate. The second end of the piston element is positioned above the first end when the tailgate is in a closed position. The piston element rotates about its first end in the same direction as the tailgate, extending and providing a torque about the tailgate's axis of rotation in a direction opposite to the direction of rotation of the tailgate. The piston element has no lost motion relative to the pivoting main body over a range of motion of the tailgate. The piston element may be, for example, a damper or a gas spring. The lift assist counterbalance may be, for example, an internal or external torque rod. The piston element and/or the torque rod may be retrofitted onto a truck.

A method for providing a damper for a tailgate also is described. A first end of a piston element is firmly mounted to a ferrule of a counterbalance at an offset position that is above the axis of rotation of a pivot for a main body, i.e., a tailgate, the counterbalance at least partially offsetting the weight of the main body. A second end of the piston element is mounted at a fixed location of the main body such that the second end is positioned above the first end when the main body is in a closed position and such that the piston element extends and provides a torque about the pivot in a direction opposite to the direction of rotation of the main body. The piston element has no lost motion relative to the pivoting main body when the pivoting main body is in an open position.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 shows the play provided by the present invention to facilitate tailgate installation and removal.

FIGS. 5A and 5B illustrate a deformation of one of the components of the present invention to achieve a snug fit without relying on tight tolerances in manufacture.

DETAILED DESCRIPTION OF THE INVENTION

A description of example embodiments of the invention follows.

The addition of a damper solves the dilemma of a tailgate kicking up and down violently when driving with an open tailgate by cushioning the descent if the tailgate kicks up. The damper makes it possible to engineer a substantially more effective counter-balance.

For the damper to be effective in cushioning the tailgate as it kicks up going over a bump, it is imperative that the damper be attached between the tailgate and the truck body without any lost motion, i.e., play or slack. Any lost motion would translate into unacceptable banging.

It is for this reason that the retrofit attachments proposed in the prior art such as shown in FIG. 5, 6 or 7 of U.S. Application Publication No.: 2008/0277960, now U.S. Pat. No. 7,695,043, issued on Apr. 13, 2010, are not entirely satisfactory. The approaches described in that patent, which is incorporated by reference in its entirety, necessitate a discrete amount of play to make it possible to install the tailgate, but it is this very play that becomes objectionable when going over a bump with an open tailgate.

Thus, a way of retrofitting a damper that combines ease of tailgate installation with no play between the truck body and the tailgate is highly desirable.

Figure 1A:
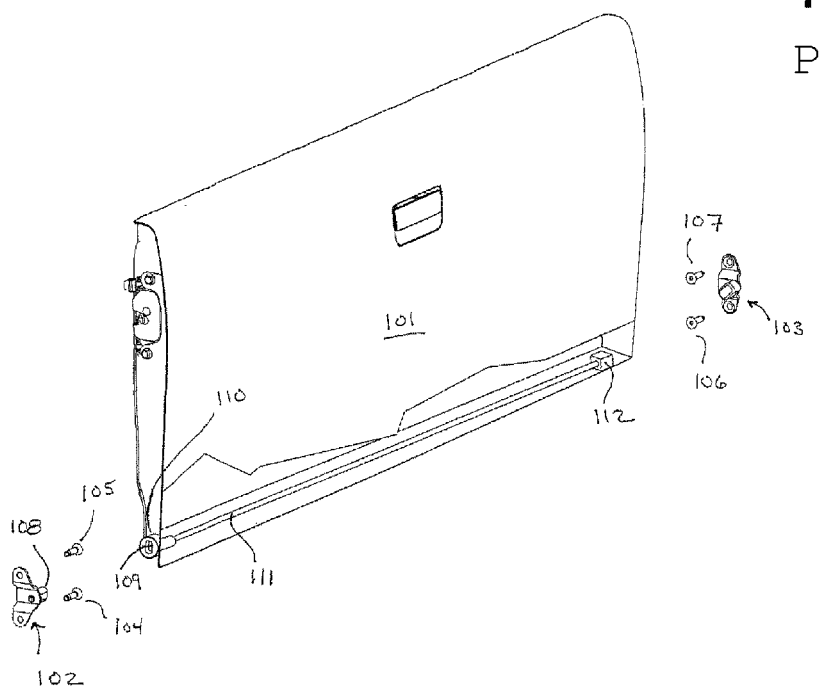
FIGS. 1A and 1B is a perspective exploded view of a tailgate constructed according to the state of the art with a torque rod but without a damper in the closed and open positions respectively.
Figure 1B:
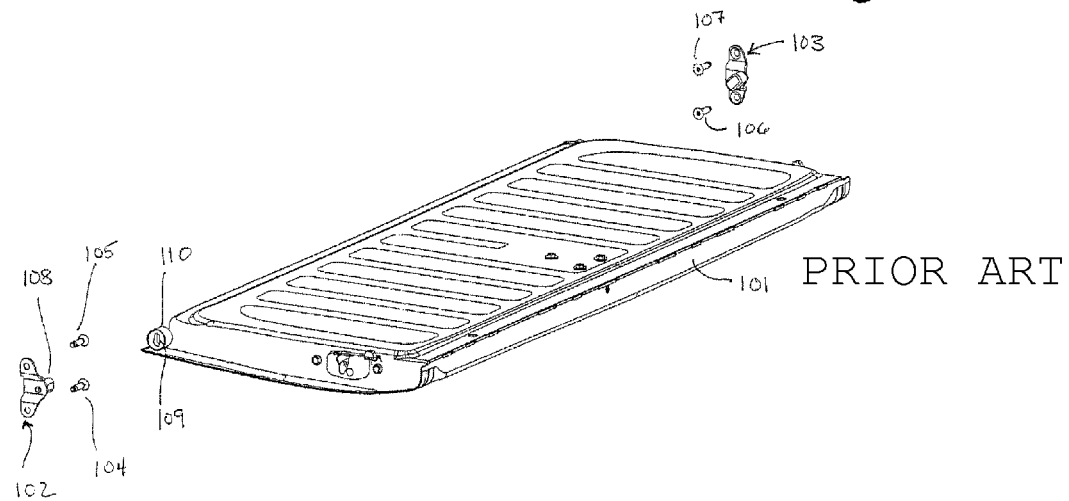

The features of a tailgate constructed according to the state of the art with a torque rod are shown in FIGS. 1A and 1B. The tailgate 101 is supported on two pintels 102 and 103 that are mounted to the sides of the truck with fasteners 104, 105, 106 and 107. The pin 108 of the driver's side pintel that engages the tailgate has two flat sides that engage the oblong recess 109 of the ferrule 110 that is attached to the torque rod 111. The other end of the torque rod attaches firmly to the tailgate with a pinch block 112. Some commonly-used, but non-limiting, dimensions in the art are:

| | |
|---|---|
| Width of Pintel Pin | .490 |
| Height of Pintel Pin | .884 |
| Width of oblong recess | .550 |
| Height of oblong recess | .943 |

The size of the Pintel pin 108 is smaller than the oblong recess 109 to permit easy installation and 10 degrees of lost motion to permit the tailgate to be partially open during installation. Once the tailgate is opened beyond 10 degrees the torque rod is restrained from turning at the ferrule end whilst the pinch block end continues to turn as the tailgate is lowered thus imparting a twist to the torque rod that creates a torsion stress to partially counterbalance the weight of the tailgate.

Figure 2:
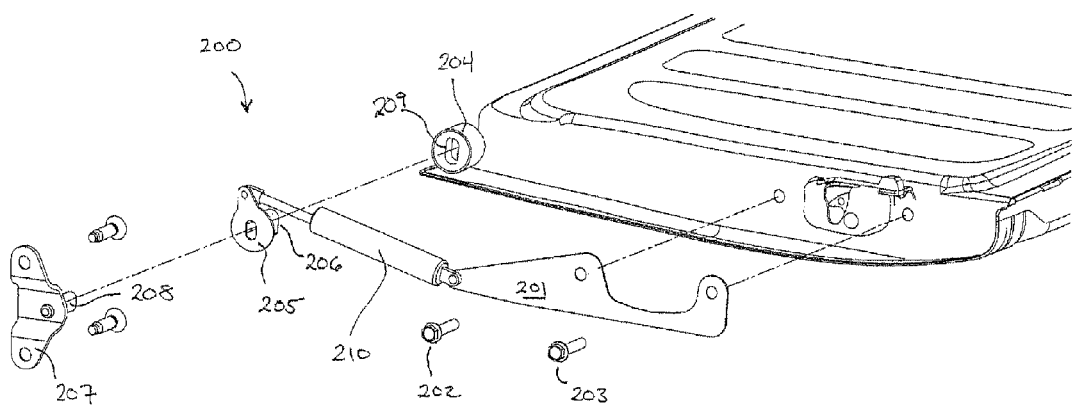
FIG. 2 is a perspective view of a damper installation according to the present invention.
Figure 3:
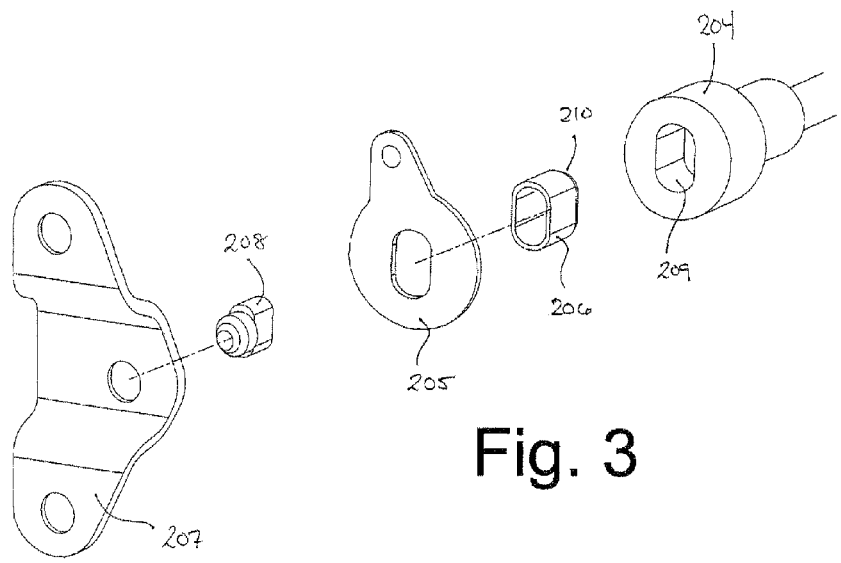
FIG. 3 is a detail of a damper installation according to the present invention with an exploded view of the working parts

The features of the present invention are shown in FIGS. 2 and 3. The cylinder 210 of the damper 200 mounts to the tailgate with a bracket 201 that attaches with fasteners 202 and 203. The rod end of the damper attaches pivotally to the crank 205. Crank 205 contains an oblong sleeve 206 that fits tightly into the oblong recess 209. The sleeve 206 has a chamfer 210 to facilitate assembly into the recess. A retrofit pintel 207 with a smaller flat-sided pin 208 mounts to the truck with fasteners 104 and 105. The pin 208 engages the inside of the sleeve 206. The pin 208 is generally welded or brazed to the retrofit pintel 207 but for clarity it shown in an exploded view in FIG. 3. Similarly, the sleeve 206 is generally welded or brazed to the crank 205 but again for clarity it shown in an exploded view in FIG. 3. Some suitable, but non-limiting, dimensions for a typical embodiment of the present invention build to fit the tailgate as described before are:

| | |
|---|---|
| Width of retrofit Pintel Pin | .360 |
| Height of retrofit Pintel Pin | .754 |
| Outside width of sleeve | .545 |
| Height of oblong recess | .938 |
| Wall thickness of Sleeve | .065 |

It will be appreciated that the sleeve 206 is only a few thousands smaller than the oblong recess 209 of the ferrule 204 to obtain a push fit. The sleeve is thus tapped into the ferrule for installation and remains captured by friction in this position. In this manner a firm connection between the damper and the torque rod is established that results in no lost motion. The flat-sided pin 208 of the retrofit pintel 207 however is undersized relative to the inside of the sleeve to maintain a 10 degree play between the two (as shown in FIG. 4 from A to B) and liberal clearance for installation when there is no strain on the torque rod. Once the tailgate is lowered however, the torque rod exerts such a strong torque against the pintel that any momentary lifting of the tailgate—such as occurs when driving over a bump—will not create any lost motion. In this manner the conflicting objectives of liberal clearance for installation and no lost motion when the tailgate is partially opened are met.

FIGS. 5A and 5B illustrate another embodiment of the sleeve 504 on a crank 506. The sleeve 504 is dimensioned to be a loose fit with the oblong recess 209 to permit wide manufacturing tolerances but subsequently deformed 502 to create an interference fit with the oblong recess by bellowing out the flat sides as shown in the BEFORE and AFTER views in FIGS. 5A and 5B, respectively. The bellowing out of the flat sides creates a firm connection between the damper and the torque rod that results in no lost motion.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A damper for a vehicle tailgate comprising:
    a crank firmly connected by a sleeve of the crank to a ferrule of a counterbalance of a vehicle tailgate, the sleeve extending into a recess in the ferrule and comprising an inside configured to receive a pintel pin mounted to the vehicle, the counterbalance configured to at least partially offset the weight of the pivotable vehicle tailgate, the ferrule configured to removably couple to a bed of the vehicle at an axis about which the tailgate pivots and to remain in a fixed orientation to the bed over a range of pivoting motion of the vehicle tailgate; and
    a piston element having a first end coupled to the crank and a second end configured to be connected at a fixed location on the tailgate, with the second end being positioned above the first end when the tailgate is in a closed position, the piston element being configured to extend and to provide a torque about the pivot in a direction opposite to the direction of rotation of the pivotable tailgate, the piston element rotating with and in the same direction as the tailgate about its first end.

2. The damper of claim 1 wherein the piston element is a damper.

3. The damper of claim 1 wherein the piston element is a gas spring.

4. The damper of claim 1 wherein the piston element is retrofitted.

5. The damper of claim 1 wherein the counterbalance includes a preexisting internal torque rod.

6. The damper of claim 1 wherein the firm connection is a friction fit between the sleeve and the recess in the ferrule.

7. The damper of claim 6 wherein the firm connection is a interference fit between the sleeve and the recess in the ferrule.

8. A tailgate of a vehicle comprising:
    a pivoting main body;
    a pivot about which the main body pivots, the pivot being at a fixed location relative to a truck bed;
    a counterbalance configured to at least partially offset the weight of the pivoting main body, the counterbalance having a ferrule at an end that is configured to removably couple to the truck bed at an axis about which the pivoting main body pivots and to remain in a fixed orientation to the truck bed over a range of pivoting motion of the pivoting main body;
    a crank firmly connected by a sleeve of the crank to the ferrule, the sleeve extending into a recess in the ferrule and comprising an inside configured to receive a pintel pin mounted to the vehicle; and
    a piston element having a first end coupled to the crank and a second end configured to be connected at a fixed location on the tailgate, with the second end being positioned above the first end when the tailgate is in a closed position, the piston element being configured to extend and to provide a torque about the pivot in a direction opposite to the direction of rotation of the pivotable tailgate, the piston element rotating with and in the same direction as the tailgate about its first end.

9. The tailgate of claim 8 wherein the piston element is a damper.

10. The tailgate of claim 8 wherein the piston element is a gas spring.

11. The tailgate of claim 8 wherein the piston element is retrofitted.

12. The tailgate of claim 8 wherein the counterbalance includes a preexisting internal torque rod.

13. The tailgate of claim 8 wherein the firm connection is a friction fit between the sleeve and the recess in the ferrule.

14. The damper of claim 13 wherein the firm connection is a interference fit between the sleeve and the recess in the ferrule.

15. A method for providing damping for a tailgate comprising:
    firmly mounting a crank to a ferrule of a counterbalance at an offset position above an axis of rotation of a pivot for a pivoting main body, the crank being firmly mounted by mounting a sleeve of the crank to extend into a recess in the ferrule, the sleeve comprising an inside configured to receive a pintel pin mounted to the vehicle, the counterbalance configured to at least partially offset the weight of the pivoting main body, and the ferrule of the counterbalance configured to removably couple to a bed of the vehicle at an axis about which the tailgate pivots and to remain in a fixed orientation to the bed over a range of pivoting motion of the pivoting main body;

mounting a first end of a piston element to the crank;

mounting a second end of the piston element at a fixed location of the main body in a manner that the second end is positioned above the first end when the main body is in a closed position; and the piston element extending and providing a torque about the pivot in a direction opposite to the direction of rotation of the pivoting main body, the piston element rotating with and in the same direction as the main body about its first end.

16. The method of claim 15 wherein the piston element is a damper.

17. The method of claim 15 wherein the piston element is a gas spring.

18. The method of claim 15 wherein mounting the first and second ends of the piston element further includes retrofitting.

19. The method of claim 15 wherein providing the torque further includes the use of a preexisting torque rod internally attached to the pivoting main body.

20. The method of claim 15 wherein providing a counterbalance includes providing an internal torque rod in the pivoting main body.

21. The method of claim 15 wherein firmly mounting the crank to the ferrule of the counterbalance comprises interference fitting the sleeve into the recess in the ferrule.

* * * * *